May 19, 1964     C. H. HAYNES     3,133,504
DYNAMO AND PUMP DEVICE
Original Filed Nov. 30, 1955     2 Sheets-Sheet 1

INVENTOR.
Clyde H. Haynes

May 19, 1964   C. H. HAYNES   3,133,504
DYNAMO AND PUMP DEVICE
Original Filed Nov. 30, 1955   2 Sheets-Sheet 2

INVENTOR.

Clyde H. Haynes ns of United States Patent Office 3,133,504
Patented May 19, 1964

3,133,504
DYNAMO AND PUMP DEVICE
Clyde H. Haynes, 221 Townsend Ave.,
Pelham Manor, N.Y.
Continuation of application Ser. No. 549,973, Nov. 30, 1955. This application Dec. 27, 1961, Ser. No. 167,461
20 Claims. (Cl. 103—87)

This invention relates to dynamos having somewhat cone-shaped rotor and stator members and in particular to an electric pump in which the rotor pumps the fluid. This is a continuation of application Serial Number 549,973, filed November 30, 1955, now abandoned.

Electric pumps have been manufactured in the past in which the rotor of the motor also served as a rotor or fluid driving member of the pump. In these designs the rotor was cylindrical in shape and rotated on the inside of the stator. A hole was provided axially in the center of the rotor and fluid driving fins on the end of the rotor pulled fluid through the hole and pumped it centrifugally from the motor or pump. In many instances the motor or stator was actually canned so that the windings would be sealed away from the fluid being pumped.

In the present design, the stator is mounted on the inside of the rotor and the fluid driving fins are on the outside of the rotor. The rotor and stator are somewhat cone-shaped, thus providing a maximum pumping action in a minimum of length of the pump.

One of the objects of the invention is to provide an electric motor pump having a tapered and somewhat cone-shaped stator encircled by a rotor with fluid driving vanes on the outside of the rotor.

Another object of the invention is to provide an electric pump wherein the rotor of the motor contacts and pumps the fluid.

A further object of the invention is to provide a pump which is simple in construction and economical to operate and manufacture.

A further object of the invention is to provide a somewhat cone-shaped member for a dynamo.

A still further object of the invention is to provide a hollow somewhat cone-shaped member for a dynamo.

Figures 1, 2:
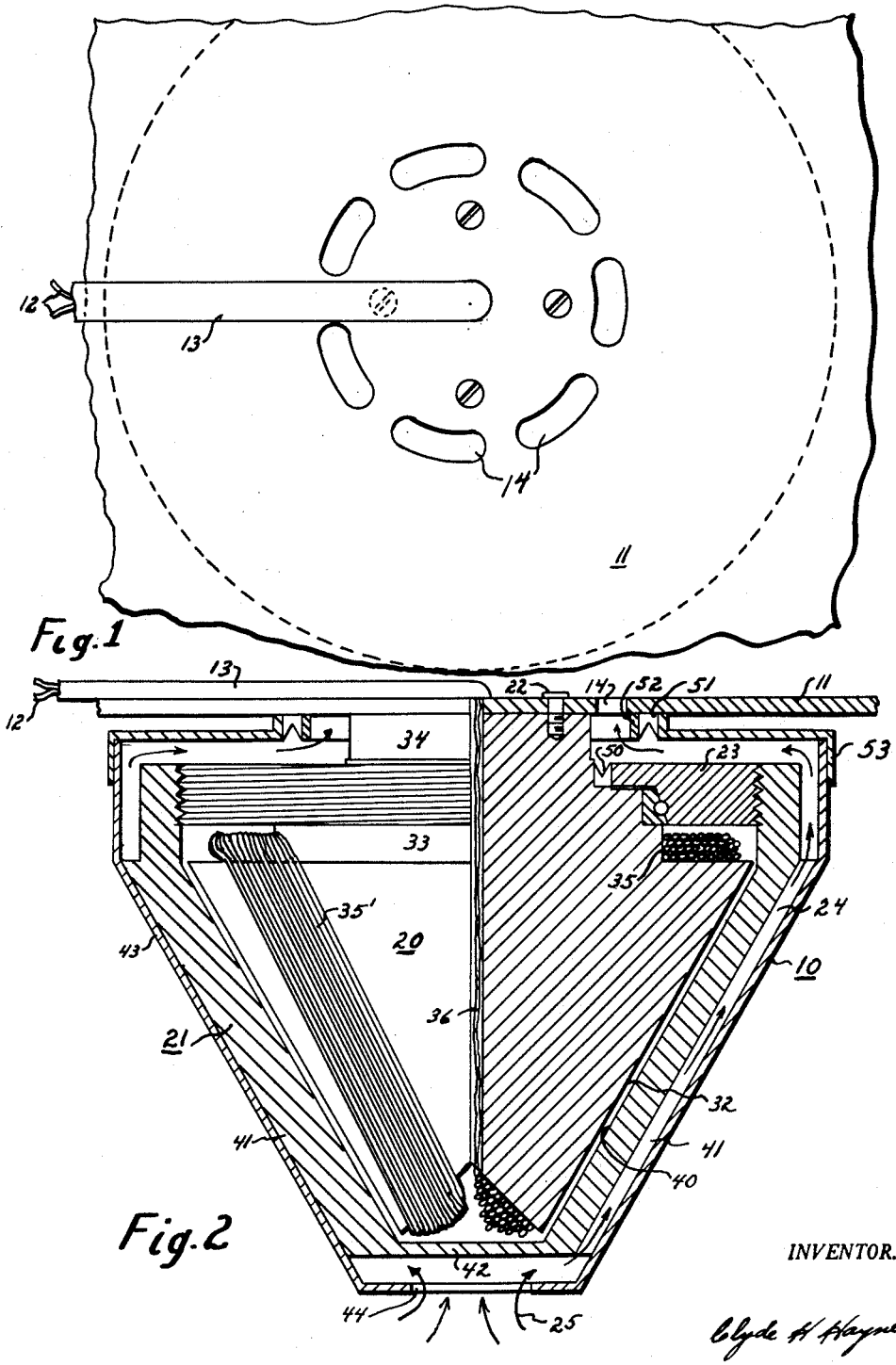
Figure 3:
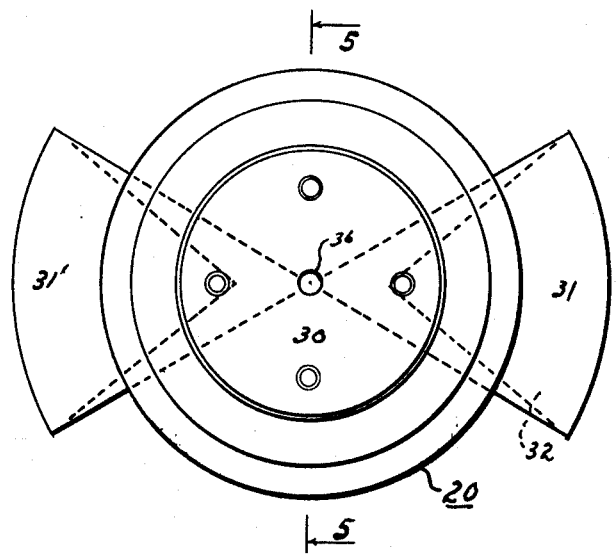
Figures 4, 5:
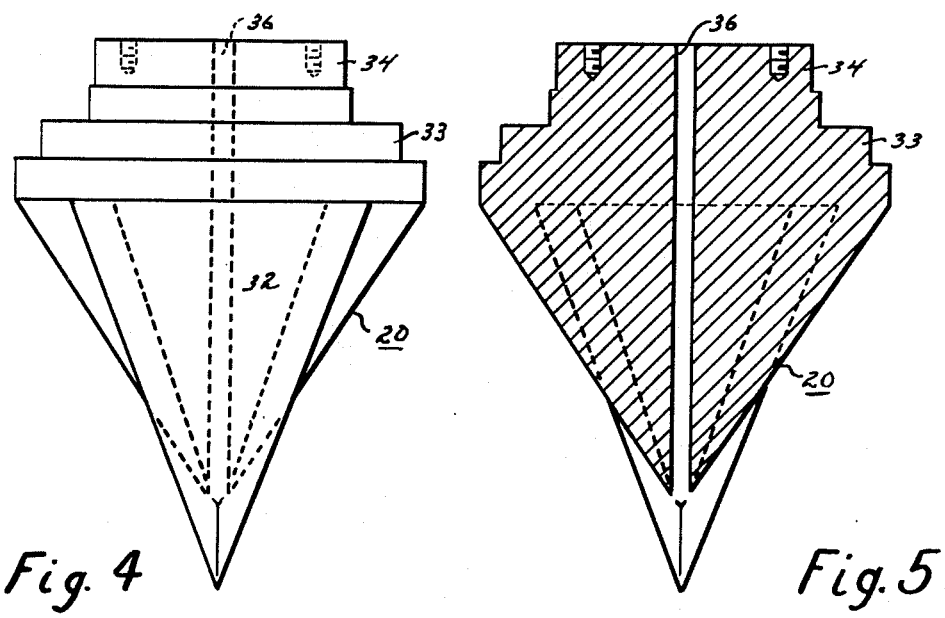

Other objects and a fuller understanding of this invention may be had by referring to the following description and claims taken in conjunction with the accompanying drawings in which:

FIGURE 1 is a top plan view of the pump;
FIGURE 2 is an elevational view of the pump, with certain parts illustrated in cross-section;
FIGURE 3 is a top plan view of the somewhat cone-shaped magnetizable member that serves as a stator for the pump;
FIGURE 4 is an end elevational view of the stator; and
FIGURE 5 is a sectional view taken along the line 5—5 of FIGURE 3.

The electric pump illustrated consists of a dynamo type pump mounted on a supporting structure 11 and connectable to a source of electricity by means of wires 12 running through a conduit 13. The supporting structure 11 is illustrated as a top of a reservoir tank or a wall which is provided with fluid passages 14. The fluid is pumped by the dynamo pump 10 from a low pressure area on one end of the pump to a high pressure area at the other end of the pump. This supporting structure 11 may be mounted on top of a reservoir and in a pipe extending away from the pump or it may be mounted internally within a pipe line and the pump used as a booster pump which is completely inside of the pipe line. The conduit 13 seals the wiring away from contact with the fluid being pumped. The term fluid is used in its broad sense to include gases, liquids, radio-active material and other pumpable mediums which may be pumped through piping or conduit systems.

The dynamo pump has a magnetizable member 20 which serves as the stator and has a hollow magnetizable member 21 that serves as the rotor. The magnetizable member or stator 20 is somewhat cone-shaped and is fastened to the supporting structure 11 at its base end thereof by screws 22. Rotor 21 is provided with a bearing 23 which is threaded into the larger end thereof and engages the stator to rotatably support the rotor on the stator. The somewhat cone-shaped rotor 21 is provided with a plurality of fluid passages 24 extending from the vertex or small end thereof to the large end thereof for centrifugally and axially pumping fluid in a direction indicated by the arrows 25, and through the passages 14.

The stator or magnetizable member 20 consists of modified cone-shaped portion 30 and somewhat wedge-shaped portions 31 and 31'. These somewhat wedge-shaped portions are circumferentially spaced apart and annularly aligned in a somewhat cone-shaped formation, and are joined together in the center thereof. In the present design the wedge-shaped portions are joined together at the center thereof by the modified cone-shaped portion 30 since there are only two wedge-shaped portions as illustrated. However, if more than two wedge-shaped portions, which define pole regions of the stator, are designed, the portion 30 may be other than somewhat cone-shaped. The wedge-shaped portions have outer surfaces 32 which define segments of a substantially cone-shaped surface.

The stator may be constructed from a sintered ferromagnetic material formed into a single integrally joined mass or it may be constructed of a plurality of members mechanically joined together into a magnetically integral structure. The larger end of the stator or magnetizable member 20 is provided with bearing portion 23 and terminates in supporting portion 34 which receives the supporting screws 22. These portions are preferably of smaller diameter of the base of the large diameter of the main portion which has the wedge-shaped portions 31, and extend beyond the wedge-shaped portions.

The wedge-shaped portions 31 and 31' support electromagnetic coils 35 and 35' which are connected to lines 12 through a conduit 36 passing through the magnetizable member 20 to the conduit 13. The coils 35 are electrically energized so that one of the wedge-shaped portions defines the north pole of the magnet and the other portion defines the south pole of the magnet.

The rotor 21 is a hollow somewhat cone-shaped member having an inside surface 40 complementary with the outer surfaces 32 of the stator to provide as small an air gap therebetween as is conveniently practical. The rotor 31 has vanes 41 on the outside thereof and between which the fluid passes in the fluid passages 24. The rotor 21 has its vertex end 42 closed to prevent fluid from entering the stator at the vertex end. Enclosing the vanes 41 is a shell 43 which has an opening 44 at its vertex end and which cooperates with the vanes 41 to centrifugally pump fluid in the direction of the arrows 25 upon rotation of the rotor. This shell 43 is supported by the vanes. Opening 44 serves as an inlet into the pump and holes 14 in the supporting plate 11 serve as the outlet for the pump.

As was previously mentioned the rotor is rotatably mounted on the stator by the bearing 23, which extends radially inwardly from the large end of the hollow rotor towards the bearing portion 33 of the stator.

A seal 50 between the bearing 23 and the bearing portion 33 prevents fluid from leaking through the bearing and into the stator. Similarly, a seal 51 may be provided between an annular flange 52 on support 11 and a cap 53 extending inwardly from the shell 43 to prevent leakage of the fluid between the rotor and the supporting structure 11.

In manufacturing this somewhat cone-shaped centrifugal pump, the stator and the rotor are manufactured independently of each other and the coils 35 are wound on the somewhat wedge-shaped portions of the stator. The stator is then inserted in the rotor and the bearing 23 is threaded into the rotor and fixed on the stator to rotatably support and position the stator with the rotor. Next the cap 53 is placed on the rotor and the seal 51 is positioned in the cap 53. The structure is then slipped over the flange 52 on the supporting structure 11 and the screws 22 inserted to complete the unit.

The same basic structure as illustrated may be used as an agitator instead of a pump by simply removing the cap 53 and shell 43. When the cap and the shell are removed the vanes are in the open. If the apparatus is in a reservoir the vanes contact the fluid in the reservoir and since there is no definite fluid passage they will simply agitate the fluid.

It is also understood that if only the cap 53 and passages 14 are eliminated the pumping action will force the fluid up towards the supporting structure 11 and then allow it to fall by gravity back into the reservoir.

Although the dynamo pump and parts thereof have been described in their preferred embodiment it is understood that various modifications may be had without departing from the spirit and scope of the invention as hereinafter claimed.

What is claimed is:

1. An electric motor comprising a conical-shaped stator, a hollow conical-shaped rotor encircling and enclosing said stator, said rotor having a closed vertex end portion, and means rotatably supporting said rotor on said stator, said stator having a modified cone-shaped portion and wedge-shaped portions joined therewith, said wedge-shaped portions extending radially outwardly from said cone-shaped portion and defining magnetic pole regions, said cone-shaped portion having a base end adapted to support the member and a vertex end, said wedge-shaped portions extending from said base end outwardly beyond said vertex end, and current conducting magnetic field producing coils wound on said wedge-shaped portions.

2. The structure as defined in claim 1 wherein said wedge-shaped portions have outer surfaces defining segments of a cone-shaped surface.

3. An electric motor comprising a cone-shaped stator, a hollow cone-shaped rotor encircling and enclosing said stator, said rotor having a closed vertex end portion, and means rotatably supporting said rotor on said stator, said stator having a plurality of wedge-shaped portions circumferentially spaced apart and annularly aligned in a cone-shaped formation and joined together at the center thereof, said portions having outer surfaces defining segments of a cone-shaped surface, said rotor having an inside surface spaced from and complementary with said outer surfaces.

4. An electric motor comprising a cone-shaped stator, a hollow cone-shaped rotor encircling and enclosing said stator, said rotor having a closed vertex end portion, and means rotatably supporting said rotor on said stator, said stator having a plurality of wedge-shaped portions circumferentially spaced apart and annularly aligned in a conical formation and joined together at the center thereof, said portions having outer surfaces defining segments of a substantially conical shaped surface, and energizable current conducting coils wound on said wedge-shaped portions capable of establishing magnetic pole regions.

5. An electric motor comprising a tapered stator, a hollow cone-shaped rotor encircling said stator, means rotatably supporting said rotor on said stator, magnetic field producing coils on said stator, conduit means extending from said coils through said stator, coil leads electrically connected to said coils and passing through the conduit means for connecting the coils to a source of current, said rotor having a closed vertex end and an opposite end, and fluid engageable means extending from the vertex end to said opposite end for moving fluid upon rotation of the rotor relative to the stator.

6. An electric motor for moving fluid comprising electrically energizable tapered stator means to produce a magnetic field when energized and having a vertex end and a base end, a tapered rotor rotatable about said stator by said magnetic field, said rotor having a tapered body portion thereof extending generally from the vertex end of the stator towards the base end of the stator and also having a closed vertex end portion thereof rotatable about said stator vertex end and interjoined with said body portion to prevent relative movement therebetween and therewith being incapable of passage of fluid therethrough to thereby prevent fluid from entering said stator at the vertex end of the stator, and fluid exchangeable means on said rotor for moving fluid away from said vertex end portion upon energization of said stator means and rotation of said rotor relative to said stator.

7. An electric motor for moving fluid comprising electrically energizable tapered stator means to produce a magnectic field when energized and having a vertex end and a base end, a tapered rotor rotatable about said stator by said magnetic field, said rotor having a tapered body portion thereof extending generally from the vertex end of the stator towards the base end of the stator and also having a closed vertex end portion thereof rotatable about said stator vertex end and interjoined with said body portion to prevent relative movement therebetween and therewith being incapable of passage of fluid therethrough to thereby prevent fluid from entering said stator at the vertex end of the stator, and fluid exchangeable means on said rotor for moving fluid away from said vertex end upon energization of said stator means and rotation of said rotor relative to said stator, said stator means including a stator body and current conductive coils on said stator body to produce said magnetic field, and coil leads electrically connected to said coils and passing through at least a portion of said stator body for connecting the coils to a source of electrical energy.

8. An electric motor pump for pumping fluid comprising a tapered stator, a hollow cone-shaped rotor encircling said stator and having a closed small end and a large end, means rotatably supporting said rotor on said stator, said rotor having fluid pumping vanes extending outwardly therefrom, and housing means encircling and enclosing said vanes thereby defining fluid passages from the small end to the large end of the rotor, said housing having an inlet opening on the axis thereof at said small end and an outlet opening at said large end.

9. In an electric motor, a tapered stator and a hollow tapered rotor encircling said stator, said stator having a plurality of wedge-shaped portions circumferentially spaced apart and annularly aligned in a tapered formation and joined together in magnetic flux conducting relationship, said wedge-shaped portions having outer surfaces defining segments of a tapered surface and further defining magnetic pole regions, said hollow tapered rotor having a large end portion and a closed vertex end portion at the respective opposite ends thereof, bearing means between said large end portion and said stator and rotatably supporting said rotor on said stator and in magnetic flux responsive relationship with said pole regions, current conductive coils on said wedge-shaped portions, and means extending through said bearing means to energize said coils and thereby establish magnetic flux in said pole regions, said rotor further having a tapered inside surface and a tapered outside surface, said outside surface having vanes thereon extending outwardly therefrom, and a tapered shell enclosing said vanes and having an inlet opening in its small end on the longitudinal axis of said rotor and having an outlet at the periphery of the large end thereof, and means securing said shell and said tapered rotor together to prevent relative movement therebetween.

10. In an electric pump a tapered stator and a hollow tapered rotor encircling said stator, said stator having a small end and a base end, said rotor including a single mass of hollow tapered material closed at the vertex end thereof and having an opposite end, bearing means interjoining said base and opposite ends and thereby rotatably supporting said rotor on said stator, means on said stator establishing electromotive magnetic fields, and fluid conduit means extending from the vertex end to said opposite end for pumping fluid, said fluid conduit means opening at the axis of said portion on said vertex end to define a fluid inlet to said conduit means and opening at said opposite end to define a fluid outlet for said conduit means, and means securing said shell and said tapered rotor together to prevent relative movement therebetween.

11. A magnetizable member for a dynamo, said member comprising a modified cone-shaped portion and wedge-shaped portions joined therewith, said wedge-shaped portions extending radially outwardly from said cone-shaped portion and defining magnetic pole regions, said cone-shaped portion having a base end adapted to support the member and a vertex end, said wedge-shaped portions extending from said base end outwardly beyond said vertex end.

12. A magnetizable member for a dynamo, said member comprising a modified cone-shaped portion and at least two wedge-shaped portions joined therewith, said wedge-shaped portions extending radially outwardly from and annularly spaced about said cone-shaped portion and terminating in individual annularly spaced outer surfaces respectively defining magnetic pole regions, said cone-shaped portion having a base end adapted to support the member and a vertex end, said wedge-shaped portions extending from said base end outwardly beyond said vertex end, a coil wound on at least one of said wedge-shaped portions and lying alongside said cone-shaped portion, said at least one of said wedge-shaped portions being smaller at said cone-shaped portion than at the said outer surface and thereby resisting movement of said coil away from said cone-shaped portion.

13. In a dynamo, a magnetizable member having a modified cone-shaped portion and wedge-shaped portions joined therewith, said wedge-shaped portions extending radially outwardly from said cone-shaped portion and defining magnetic pole regions, said cone-shaped portion having a base end adapted to support the member and a vertex, said wedge-shaped portions extending from said base end outwardly beyond said vertex end, and current conducting coils wound on said wedge-shaped portions.

14. In a dynamo, a magnetizable member having a modified cone-shaped portion and wedge-shaped portions joined therewith, said wedge-shaped portions extending radially outwardly from said cone-shaped portion and defining magnetic pole regions, said cone-shaped portion having a base end adapted to support the member and a vertex, said wedge-shaped portions extending from said base end outwardly beyond said vertex end, said wedge-shaped portions having outer surfaces defining segments of a cone-shaped surface, and current conducting coils wound on said wedge-shaped portions.

15. A structure for a dynamo comprising a tapered first portion having a large end and a small end, a plurality of second portions joined in magnetic flux conducting relationship with said first portion, said second portions extending radially outwardly from said first portion at spaced locations about said first portion and defining magnetic pole regions about said first portion, said second portions extending from said large end outwardly beyond said small end of said first portion.

16. The structure as defined in claim 15 including magnetic flux producing current conductive coil means arranged with said second portions and energizable to produce said magnetic pole regions.

17. The structure as defined in claim 16 including conduit means extending through said first portion from said large end to said coil means, and means in said conduit means for connecting said coil means to a source of electrical energy.

18. A structure for a dynamo comprising a tapered core portion having a large end and a small end, a plurality of second portions joined in magnetic flux conducting relationship with said core portion, said second portions extending radially outwardly from said core portion at spaced locations about said core portion and defining magnetic pole regions about said core portion, said second portions extending outwardly beyond said small end of said core portion.

19. The structure as defined in claim 18 additionally including conduit means through said core portion and extending from next adjacent one of said second portions to said large end of said core portion.

20. An electric motor comprising a tapered stator of an integrally joined mass of sintered ferromagnetic material, a hollow cone-shaped rotor encircling said stator, means rotatably supporting said rotor on said stator, magnetic field producing coils on said stator, conduit means extending from said coils through said stator, coil leads electrically connected to said coils and passing through the conduit means for connecting the coils to a source of current, said rotor having a closed vertex end and an opposite end interjoined to prevent relative movement therebetween, and fluid engageable means joined with and extending outwardly from said rotor and disposed between the ends thereof for moving fluid upon rotation of the rotor relative to the stator.

References Cited in the file of this patent

UNITED STATES PATENTS

| | | |
|---|---|---|
| 690,100 | Chodzko | Dec. 21, 1901 |
| 1,632,357 | White | June 14, 1927 |
| 1,810,083 | Norinder | June 16, 1931 |
| 2,225,338 | Geiss | Dec. 17, 1940 |
| 2,256,659 | Thrasher | Sept. 23, 1941 |
| 2,629,330 | Meline | Feb. 24, 1953 |
| 2,772,046 | Shomphe | Nov. 27, 1956 |

FOREIGN PATENTS

| | | |
|---|---|---|
| 220,878 | Germany | of 1908 |